US007228023B1

(12) United States Patent
Jones

(10) Patent No.: US 7,228,023 B1
(45) Date of Patent: Jun. 5, 2007

(54) PLANAR NON-MAGNETIC OPTICAL ISOLATOR

(75) Inventor: Richard Jones, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 11/322,519

(22) Filed: Dec. 30, 2005

(51) Int. Cl.
*G02B 6/12* (2006.01)
*G02B 6/42* (2006.01)
*G02F 1/035* (2006.01)

(52) U.S. Cl. .............................. 385/14; 385/45; 385/2
(58) Field of Classification Search .................. 385/14, 385/16–23, 44, 45, 1–3, 39–42; 356/460, 356/464
See application file for complete search history.

(56) References Cited

U.S. PATENT DOCUMENTS

| 4,645,345 | A * | 2/1987 | Domann ...................... 356/460 |
| 6,175,668 | B1 * | 1/2001 | Borrelli et al. ................ 385/11 |
| 6,947,619 | B2 * | 9/2005 | Fujita et al. ................... 385/11 |
| 2006/0222283 | A1 * | 10/2006 | Salib et al. .................... 385/11 |

OTHER PUBLICATIONS

Giboney, K. S., "Traveling-Wave Photodetectors," IEEE Photonics Technology Letters, vol. 4, No. 12, Dec. 1992, pp. 1363-1365.
Yokoi, H. et al., "Feasibility of Integrated Optical Isolator with Semiconductor Guiding Layer Fabricated by Wafer Direct Bonding," IEEE Proc.-Optoelectron., vol. 146, No. 2, Apr. 1999, pp. 105-110.
Levy, M., "The On-Chip Integration of Magnetooptic Waveguide Isolators," IEEE Journal of Selected Topics in Quantum Electronics, vol. 8, No. 6, Nov./Dec. 2002, pp. 1300-1306.
Bhandare, S. et al., "Novel Nonmagnetic 30-dB Traveling-Wave Single-Sideband Optical Isolator Integrated in III/V Material," IEEE Journal of Selected Topics in Quantum Electronics, vol. 11, No. 2, Mar./Apr. 2005, pp. 417-421.

* cited by examiner

*Primary Examiner*—Brian Healy
*Assistant Examiner*—Charlie Peng
(74) *Attorney, Agent, or Firm*—Blakely, Sokoloff, Taylor & Zafman LLP

(57) ABSTRACT

An optical isolator is disclosed. An apparatus according to aspects of the present invention includes a Mach-Zehnder Interferometer (MZI) disposed in semiconductor material. The MZI has first and second arms. An optical beam is to propagate through the MZI in a forward direction. The apparatus further includes first and second optical modulators disposed in the first and second arms, respectively, of the MZI. The first and second optical modulators have traveling wave electrodes, which are coupled to receive first and second traveling wave signals, respectively. The first and second traveling wave signals are to generate traveling waves in the MZI that propagate in a reverse direction opposite to the forward direction. The first and second traveling wave signals to have a pi phase shift relative to each other such that there is constructive interference of the optical beam propagating through the MZI in the forward direction and there is destructive interference of an optical beam propagating through the MZI in the reverse direction.

21 Claims, 3 Drawing Sheets

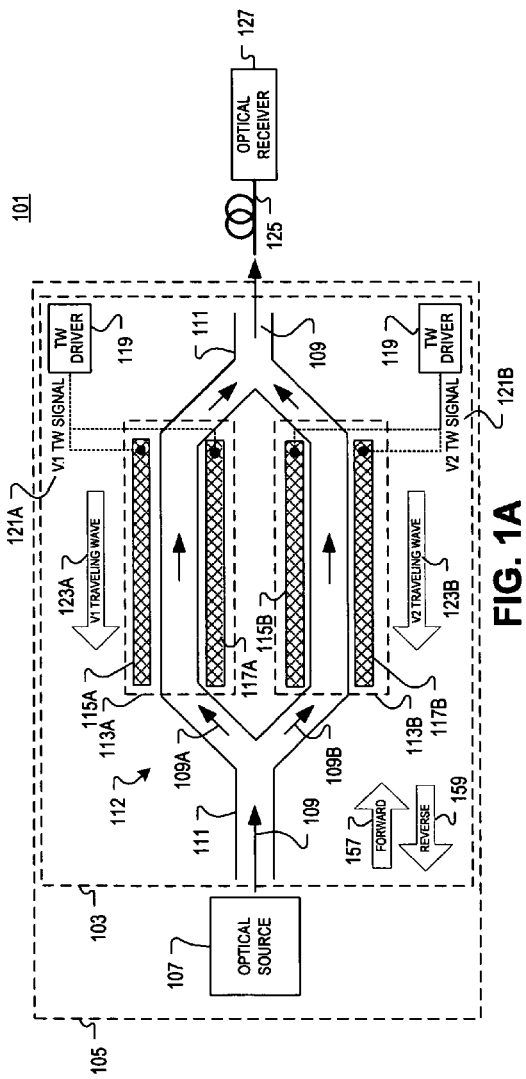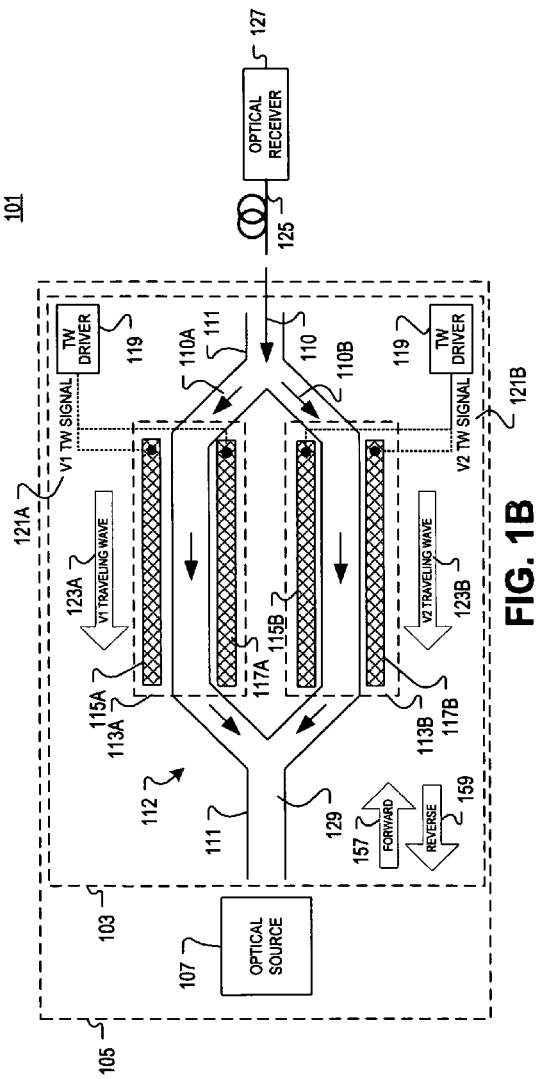

PLANAR NON-MAGNETIC OPTICAL ISOLATOR

BACKGROUND OF THE INVENTION

1. Field of the Invention

Embodiments of invention relate generally to optical devices and, more specifically but not exclusively relate to isolating optical beams.

2. Background Information

The need for fast and efficient optical-based technologies is increasing as Internet data traffic growth rate is overtaking voice traffic pushing the need for fiber optical communications. Transmission of multiple optical channels over the same fiber in the dense wavelength-division multiplexing (DWDM) system provides a simple way to use the unprecedented capacity (signal bandwidth) offered by fiber optics. Some examples of commonly used optical components in the system may include wavelength division multiplexed (WDM) transmitters and receivers, optical filter such as diffraction gratings, thin-film filters, fiber Bragg gratings, arrayed-waveguide gratings and optical isolators. Optical isolators are useful components for optical communication systems to protect both lasers and/or amplifiers from damage. In particular, optical isolators allow light to propagate in one direction, but do not allow light to propagate in the opposite direction. By isolating the lasers and/or amplifiers, the lasers and/or amplifiers can be protected from unwanted reflections, which helps improve stability. However, common optical isolators utilize magnetic-based principles, which are extremely difficult to integrate with waveguide based devices and/or can introduce undesired effects such as frequency shift in the output optical beam.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1A is a block diagram illustrating an optical system including an example of an optical isolator allowing an optical beam to propagate from an optical source according to an embodiment of the present invention.

FIG. 1B is a block diagram illustrating the optical system including the example of the optical isolator preventing a reflected optical beam from propagating back to the optical source according to an embodiment of the present invention.

DETAILED DESCRIPTION

Figure 2:
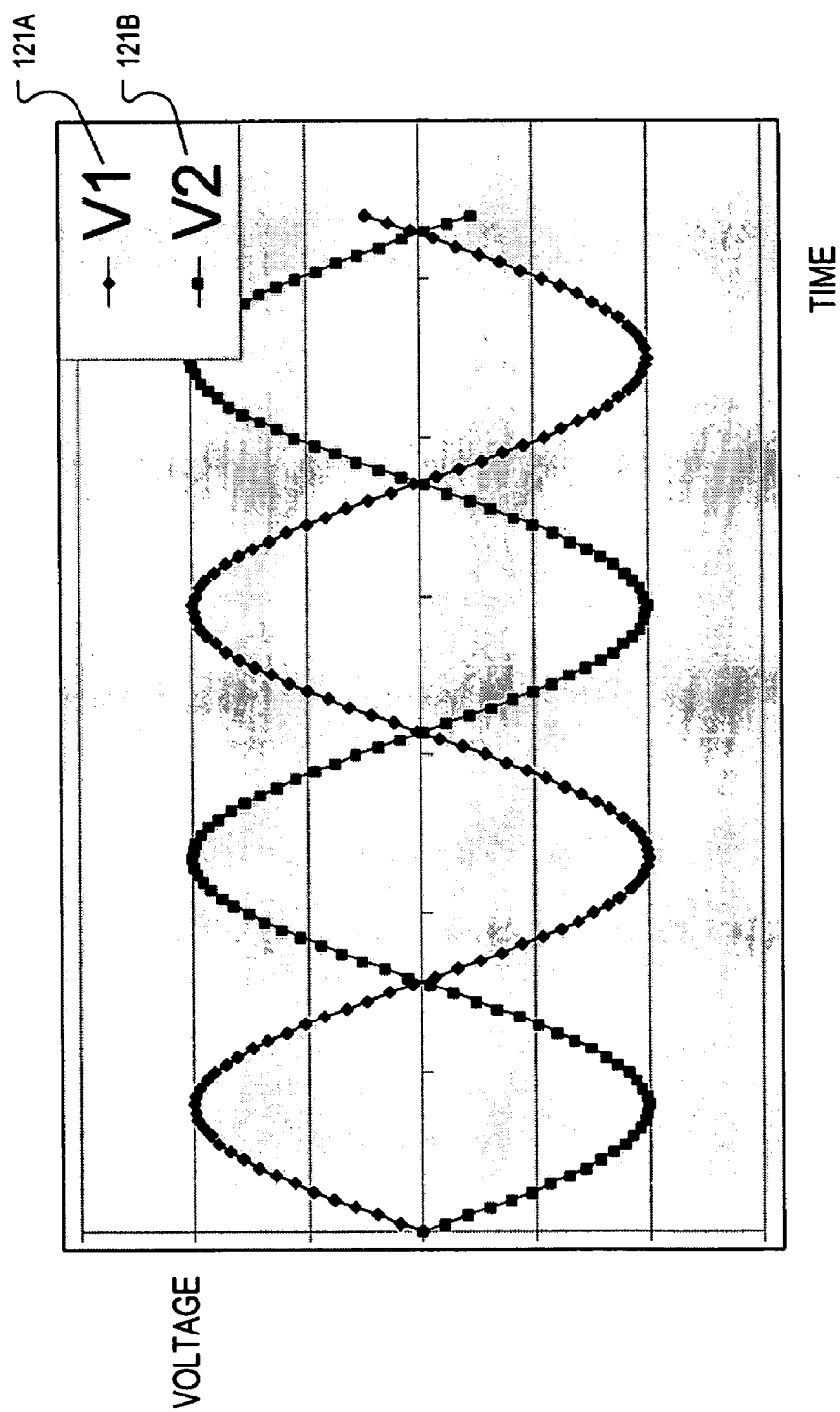
FIG. 2 is a diagram illustrating traveling wave signals with a pi phase shift between them, which are used to drive optical modulators of an example optical isolator in accordance with the teachings of the present invention.

Methods and apparatuses for isolating an optical beam are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

FIG. 1A illustrates generally one example of an optical system 101 including one example of an optical isolator 103 in accordance with the teachings of the present invention. As shown in the depicted example, optical isolator 103 is disposed in semiconductor material 105. In another example, optical isolator 103 may be disposed in another material instead of semiconductor material 105. For instance, optical isolator 103 may be disposed in any suitable optical material including for example organic materials such as a polymer material or the like.

In one example, an optical source 107 is also disposed in semiconductor material 105. In another example, optical source 107 is separate from semiconductor material 105. An optical beam 109 is directed from optical source 107 into optical waveguide 111 of optical isolator 103. Optical source 107 may be one of an optical laser, an optical amplifier or the like, from which optical beam 109 is directed. As shown in the depicted example, optical beam 109 is directed from optical source 107 into optical isolator 103 in the forward direction 157, which in the illustrated example is from left to right.

As shown in the depicted example, a Mach Zehnder Interferometer (MZI) structure 112 is included in semiconductor material 105 of optical isolator 103. As such optical waveguide 111 is split such that optical beam 109 is split into two parts, optical beam 109A and optical beam 109B, each of which is directed through one of the two respective arms of the MZI 112. As shown in the illustrated example, there is an optical modulator included in each arm of MZI 112. In particular, an optical modulator 113A is in one of the arms of MZI 112 and another optical modulator 113B is in the other arm of MZI 112. Optical modulator 113A includes traveling wave electrodes 115A and 117A and optical modulator 113B includes traveling wave electrodes 115B and 117B. Traveling wave electrodes 115A and 117A are coupled to receive V1 traveling wave (TW) signal 121A from TW driver 119 and traveling wave electrodes 115B and 117B are coupled to receive V2 TW signal 121B from TW driver 119.

In the illustrated example, it is noted that TW driver 119 is illustrated as including separate circuits disposed in semiconductor material 105, one of which generating V1 TW signal 121B and the other of which generating V2 TW signal 121B. In another example, V1 TW driver may be included on a different semiconductor substrate and separate from semiconductor material 105. In yet another example, V1 TW driver 119 is one circuit having two separate outputs, V1 TW signal 121A and V2 TW signal 121B, each of which having a pi phase shift relative to each other in accordance with the teachings of the present invention.

In the illustrated example, optical modulators 113A and 113B are phase modulators in each arm of MZI 112 that are driven by traveling wave electrodes. The traveling wave architecture according to examples of the present invention break the symmetry of light traveling in opposite directions. In particular, the V1 TW signal 121A received at traveling wave electrodes 115A and 117A generates V1 traveling wave 123A in optical modulator 113A, which is illustrated in FIG. 1A as traveling in the reverse direction 159. Similarly, the V2 TW signal 121B received at traveling wave electrodes 115B and 117B generates V2 traveling wave 123B in optical modulator 113B, which is illustrated in FIG. 1A as also traveling in the reverse direction 159.

In operation, FIG. 1A shows that the forward direction 157 traveling optical beam 109 or optical wave is counter-propagating to the electrical traveling waves 123A and 123B in the arms of MZI 112. Since the optical waves of optical beam 109 and traveling waves 123A and 123 are in opposite directions, the optical waves of optical beam 109 receive substantially no phase shift as a result of optical modulators 113A and 113B in accordance with the teachings of the present invention.

As a result, at the output of MZI 112 where the two arms if MZI 112 are rejoined, the light from the two arms of MZI 112 are in phase and constructively interfere such that optical beam 109 is passed through MZI 112. In the illustrated example, optical beam 109 is directed from the output of MZI 112, which is the output of optical isolator 103, to an optical receiver 127. In one example, an intervening optical medium such as an optical fiber 125 or the like may be included between optical isolator 103 and optical receiver 127 such that optical beam 109 is directed through optical fiber 125.

Directing attention now to example shown generally in FIG. 1B, assume now that there is some reflection of optical beam 109 after it is directed from the output of optical isolator 103. Consequently, a reflected optical beam 110 is illustrated in FIG. 1B propagating from optical fiber 125 back into optical waveguide 111 at the output of optical isolator 103 in the reverse direction 159, which in the illustrated example is from right to left. As the reflected optical beam 110 is directed back into MZI 112, optical beam 110 split back into two parts, shown as optical beam 110A and optical beam 110B, each of which is directed through one of the two respective arms of the MZI 112.

Since optical beams 110A and 110B are propagating in the reverse direction 159, the optical waves of optical beams 110A and 110B are now co-propagating in the same direction with the electrical traveling waves of V1 traveling wave 123A and V2 traveling wave 123B. Assuming for example that V1 TW signal 121A and V2 TW signal 121B are simple sine waves, the light of optical beams 110A and 110B in both arms of MZI 112 will be frequency shifted by an amount equal to the drive frequency of V1 TW signal 121A and V2 TW signal 121B.

FIG. 2 shows an illustration showing generally one example of the relationship of V1 TW signal 121A relative to V2 TW signal 121B in accordance with the teachings of the present invention. As shown in the illustrated example, there is a pi phase shift between V1 TW signal 121A and V2 TW signal 121B. This causes the frequency shifted optical waves of optical beams 110A and 110B to also be pi out of phase with each other. Referring now back to FIG. 1B, at the end of MZI 112 when optical beams 110A and 110B recombine, the destructively interfere with each other at input put of the MZI 112 because of the pi phase shift between the optical beams 110A and 110B. As a result, reflected optical beam 110 is blocked by optical isolator 103 such that there is no transmission of optical beam 110 after optical beams 110A and 110B are rejoined at location 129, which helps protect or isolate optical source 107 from reflected light or the like in accordance with the teachings of the present invention.

Writing the electrical field of the light in both arms of the MZI as:

$$E_1 = E_0 \exp(iwt) \quad (1)$$

and $$E_2 = E_0 \exp(i(wt + \Theta)), \quad (2)$$

the transmission of the MZI 112 can be written as:

$$I_{out} = E_0^2 + E_0^2 + 2\sqrt{E_0 E_0} \cos(\Theta)), \quad (3)$$

where $\Theta$ is the original bias placed on the MZI 112. In one example, $\Theta$ can be set so that the MZI 112 is fully transmitting optical beam 109 in the forward direction 157, that is $\Theta=0$, such as the example illustrated in FIG. 1 in accordance with the teachings of the present invention.

In the reverse direction 159 traveling example, such as that illustrated in FIG. 1B, reflected optical beams 110A and 110B experience modulation from the V1 traveling wave 123A and V2 traveling wave 123B. Assuming an electrical frequency of $\Delta f$ is placed on the traveling wave electrodes 115A, 117A, 115B and 117B, then the electrical field of the light in both arms of the MZI 112 may now be written as:

$$E_1 = E_0 \exp(i(wt + \Delta ft)) \quad (4)$$

and $$E_2 = E_0 \exp(i(wt + \Delta ft + \theta)). \quad (5)$$

Here it is assumed that the original bias on the MZI 112 was $\Theta=0$ and $\theta$ represents any difference in phase between the electrical drive on the two arms of MZI 112. In this case the output of the MZI can be written as:

$$I_{out} = E_0^2 + E_0^2 + 2\sqrt{E_0 E_0} \cos(\theta), \quad (6)$$

and by judicious choice of $\theta$, that is $\theta=\pi$, the output of the MZI 112 for the reverse direction 159 traveling optical wave can be set to zero, resulting in optical modulator 103 preventing the transmission of reflected light in accordance with the teachings of the present invention.

Figure 3:
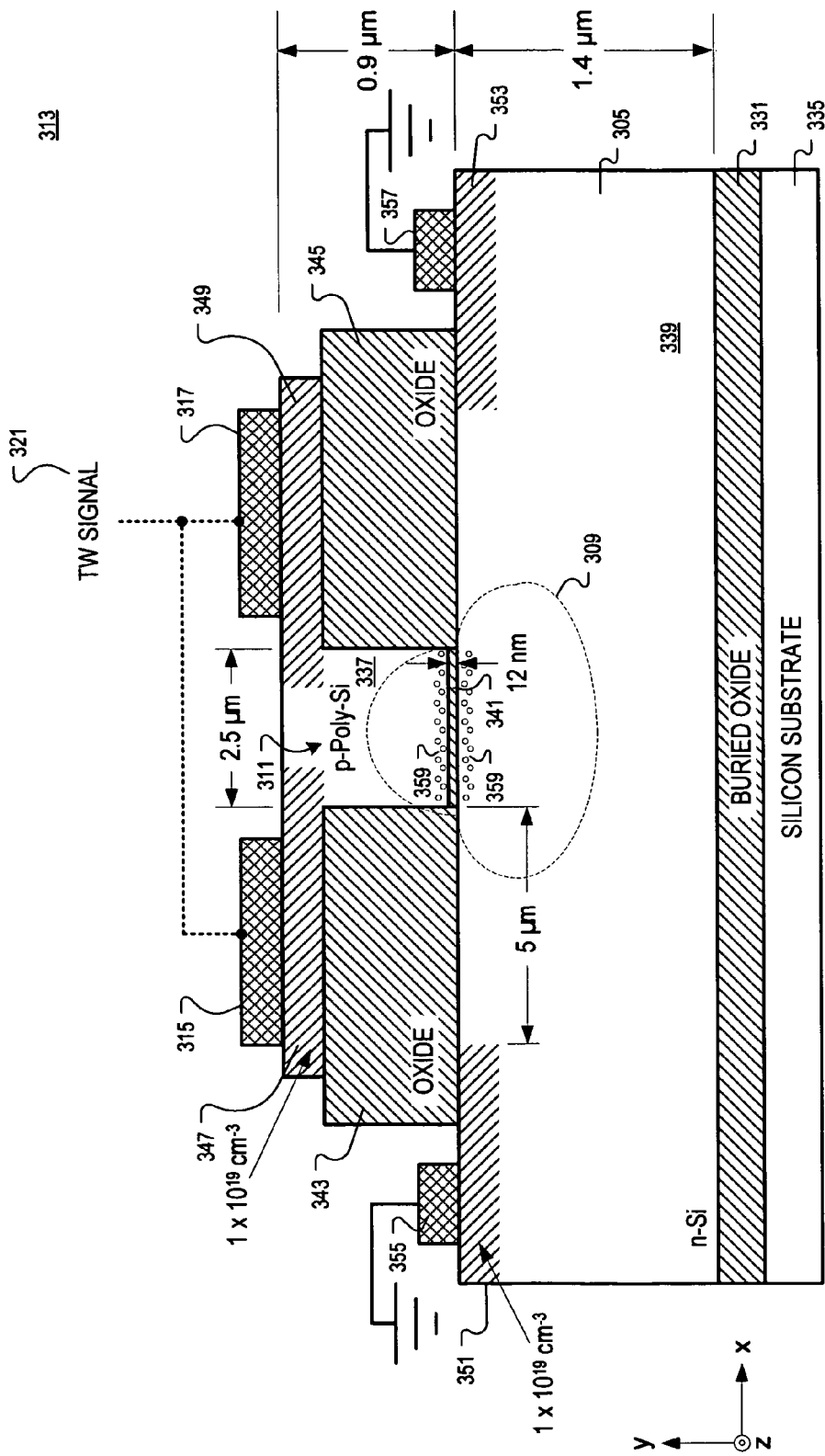
FIG. 3 is a cross-section illustration of one example of an optical modulator included in an optical isolator in accordance with the teachings of the present invention.

FIG. 3 is a cross-section illustration showing generally one example of an optical modulator 313, which may be employed for example as optical modulator 113A or 113B of FIGS. 1A and 1B in accordance with the teachings of the present invention. In the illustrated example, optical modulator 313 is disposed in semiconductor material such as silicon (Si). In the specific example shown in FIG. 3, optical modulator 313 is disposed in a silicon-on-insulator (SOI) wafer, which includes a buried oxide layer 331 disposed between a silicon layer 305 and a silicon substrate 335. As shown in optical modulator 313 includes a first region of semiconductor material 337 having a first conductivity type and a second region of semiconductor material 339 having a second conductivity type. Semiconductor material regions may include silicon, polysilicon, or other suitable types of semiconductor material in accordance with the teachings of the present invention. For instance, in the illustrated example first region of semiconductor material 337 includes polysilicon with p-type dopants and second region of semiconductor material 339 includes silicon with n-type dopants. It is appreciated that the polarities of the dopants are provided or explanation purposes and that the polarities of the dopants may be reversed in accordance with the teachings of the present invention.

In one example, an optional insulating region 341 is disposed between first and second regions of semiconductor material 337 and 339. In such an example, a complementary metal oxide semiconductor (CMOS) capacitive structure is formed. As shown in FIG. 3, charge carriers in charge regions 359 are formed proximate to insulating region 341 in first and second regions of semiconductor material 337 and 339, which form the "plates" of a capacitor while the insulating region 111 provides the insulator between the "plates." In the illustrated example, optional insulating region 341 include silicon dioxide ($SiO_2$) has a thickness of approximately 12 nm. It is appreciated of course that the specific material and thickness is provided for explanation purposes and that other thicknesses may be employed in accordance with the teachings of the present invention.

In the illustrated example, the concentration of charge carriers in charge regions 359 is modulated in response to TW signal 321 in accordance with the teachings of the present invention. TW signal 321 is an electrical traveling wave signal to generate a traveling wave in optical modulator 313 in accordance with the teachings of the present invention. Assuming TW signal 321 applies a positive drive voltage, the charge density change $\Delta N_e$ (for electrons) and $\Delta N_h$ (for holes) is related to the drive voltage $V_D$ of TW signal 321 by $$\Delta N_e = \Delta N_h = \frac{\varepsilon_0 \varepsilon_r}{e t_{ox} t}[V_D - V_{FB}] \qquad (7)$$

where $\epsilon_0$ and $\epsilon_r$ are the vacuum permittivity and low-frequency relative permittivity of insulating region 341; e is the electron charge, $t_{ox}$ is the thickness of insulating region 341, t is the effective charge layer thickness and $V_{FB}$ is the flat band voltage of the resulting capacitive structure.

In another example, optional insulating region 341 is not included. As such, a p-n junction is formed at the interface between first and second regions of semiconductor material 337 and 339. As mentioned in one example of above, first region of semiconductor material 337 includes p-type dopants and second region of semiconductor material 339 includes n-type dopants. Depending on how the p-n junction is biased, the concentration of charge carriers in charge regions 359 are modulated in response to TW signal 321 in accordance with the teachings of the present invention. For instance, in one example, the p-n junction may be forward biased or reverse biased as desired in response to TW signal 321 to modulate the concentration of charge carriers in charge regions 359 in accordance with the teachings of the present invention. In another example, it is appreciated that intrinsic material may be included to provide a p-i-n structure or the like in accordance with the teachings of the present invention.

In the illustrated example, an optical waveguide 311 is included in optical modulator 313, through which an optical beam 309 is directed along an optical path. In the example illustrated in FIG. 3, waveguide 311 is a rib waveguide. For instance, in the illustrated example, first region of semiconductor material 337 is rib region and second region of semiconductor material 339 a slab region. In the illustrated example, the rib region is defined between an insulating region 343 and an insulating region 345. As shown, insulating region 343 is disposed between traveling wave electrode 315 and the optical path of optical beam 309 and insulating region 345 is disposed between traveling wave electrode 317 and the optical path of optical beam 309. Thus, insulating region 345 and 347 optically and electrically isolate traveling wave electrodes 315 and 317 from optical beam 309 in accordance with the teachings of the present invention. In one example, insulating regions 343 and 345 include an oxide material.

In the illustrated example, the rib region defined between insulating regions 343 and 345 is approximately 2.5 µm wide and approximately 0.9 µm high. As shown, the slab region defined in the second region of semiconductor material 339 proximate to the rib region is defined between the first region of semiconductor material 337 and the buried oxide layer 331 and is approximately 1.4 µm high. It is appreciated of course that these example dimensions are provided herewith for explanation purposes and that other dimensions could be utilized in accordance with the teachings of the present invention.

In one example, optical beam 309 includes infrared or near infrared light. For example, optical beam 309 has a wavelength near approximately 1.3 µm or 1.55 µm. In the example illustrated in FIG. 3, the optical path along which optical beam 309 is directed is along an axis that parallel to the axis of the optical waveguide of optical modulator 313. In the example shown in FIG. 3, the optical path and therefore optical beam 313 are shown to propagate along a direction going through, or coming in and out of, the page.

As shown in the example of FIG. 3, second region of semiconductor material 339 is grounded through traveling wave electrodes 355 and 357 and first region of semiconductor material region 337 is coupled to receive TW signal 321 through traveling wave electrodes 315 and 317. In one example, traveling wave electrodes 315, 317, 355 and 357 are metal contacts that are coupled to first and second regions of semiconductor material 337 and 339 at locations outside the optical path of optical beam 309.

In one example, first region of semiconductor material 337 includes a higher doped region 347 at the location at which traveling wave electrode 315 is coupled to first region of semiconductor material 337. Similarly, first region of semiconductor material 337 also includes a higher doped region 349 at the location at which traveling wave electrode 317 is coupled to first region of semiconductor material 337.

In one example, second region of semiconductor material 339 includes a higher doped region 351 at the location at which traveling wave electrode 355 is coupled to second region of semiconductor material 339. Similarly, second region of semiconductor material 339 also includes a higher doped region 353 at the location at which traveling wave electrode 357 is coupled to second region of semiconductor material 339. In one example, the higher doped regions 351 and 353 are located a distance of approximately 5 µm from the rib region defined by the first region of semiconductor material 337. It is appreciated of course that this example distance is provided herewith for explanation purposes and that other distances could be utilized in accordance with the teachings of the present invention.

In an example in which first region of semiconductor material 337 includes p-type dopants and second region of semiconductor material 339 includes n-type dopants, higher doped regions 347 and 349 are heavily doped with p++ type dopants and higher doped regions 351 and 353 are heavily doped with n++ type dopants. In one example, the doping concentration of higher doped regions 347 and 349 is $1 \times 10^{19}$ $cm^{-3}$ and the doping concentration of higher doped regions 351 and 353 is $1 \times 10^{19}$ $cm^{-3}$. It is appreciated of course that these doping concentration is provided herewith for explanation purposes and that other doping concentrations could be utilized in accordance with the teachings of the present invention.

The higher doping concentrations of higher doped regions 347, 349, 351 and 353 help improve the electrical coupling of traveling wave electrodes 315, 317, 355 and 357 to first and second semiconductor material regions 337 and 339 in accordance with the teachings of the present invention. This improved electrical coupling reduces the traveling wave electrode resistance between traveling wave electrodes 315, 317, 355 and 357 and first and second semiconductor material regions 337 and 339, which reduces the RC time constant of optical modulator 313, which improves the electrical performance of optical modulator 313 in accordance with the teachings of the present invention. The reduced RC time constant of optical modulator 313 enables faster response times and device speed for optical modulator 313 in accordance with the teachings of the present invention.

As mentioned, optical beam 309 is directed through optical waveguide 311 along the optical path through charge regions 359 and TW signal 321 is applied to optical waveguide 311 to modulate the free charge carrier concentration in charge regions 359 in first and second regions of semiconductor material 337 and 339. In an example that includes optional insulating layer 341, the charge regions 359 are proximate to optional insulating layer 341. In the embodiment without optional insulating layer 341, the charge regions 359 may be proximate to the interface between first and second regions of semiconductor material 337 and 339 or throughout the optical waveguide 311, depending on how the p-n junction is biased. The applied voltage from TW signal 321 changes the free charge carrier density in charge regions 359, which results in a change in the refractive index of the semiconductor material in optical waveguide 311 in accordance with the teachings of the present invention.

In various examples, the free charge carriers in charge regions 359 may include for example electrons, holes or a combination thereof. The phase of optical beam 309 that passes through charge regions 359 is modulated in response to TW signal 321. In particular, the phase of optical beam 309 passing through free charge carriers in charge regions 359, or the absence of free charge carriers, in optical waveguide 311 is modulated due to the plasma optical effect. The plasma optical effect arises due to an interaction between the optical electric field vector and free charge carriers that may be present along the optical path of the optical beam 309 in optical waveguide 311. The electric field of the optical beam 309 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 311 of optical modulator 313 is modulated in response to the modulation of free charge carriers charge regions 359. The modulated index of refraction in the waveguide of optical modulator 313 correspondingly modulates the phase of optical beam 309 propagating through optical waveguide 311 of optical device 313. In addition, the free charge carriers in charge regions 359 are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta n L \qquad (8)$$

with the optical wavelength $\lambda$, the refractive index change $\Delta n$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \qquad (9)$$

where $n_o$ is the refractive index of intrinsic silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters. The optical absorption coefficient change $\Delta\alpha$ due to free charge carriers in silicon are given by $$\Delta\alpha = \frac{e^3\lambda^2}{4\pi^2 c^3 \varepsilon_0 n_0}\left[\frac{\Delta N_e}{m_e^{*2}\mu_e} + \frac{\Delta N_h}{m_h^{*2}\mu_h}\right] \qquad (10)$$

where $\lambda$ is the wavelength of light in free space, c is the velocity of light in a vacuum, $n_o$ is the refractive index of intrinsic silicon, $m^*_e$ is the effective mass of electrons, $m^*_h$ is the effective mass of holes, $\mu_e$ is the electron mobility and $\mu_h$ is the hole mobility.

Therefore, it is appreciated that an optical isolator including optical modulators such as optical modulator 313 provide optical isolation without having to employ a magnetic-based solution. In sum, referring back to FIGS. 1A and 1B, the traveling waves 123A and 123B on the traveling wave electrodes 115A, 117A, 115B and 117B are counter propagating to the optical wave of optical beam 109 in the forward direction 157 and the MZI 112 has no path length imbalance between the two arms of MZI 112. This example has the advantage over optical isolators in that the optical wave 109 that is passed through the optical isolator 103 incurs no frequency shift and is identical to the input wave in accordance with the teachings of the present invention.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific wavelengths, dimensions, materials, times, voltages, power range values, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
a Mach-Zehnder Interferometer (MZI) disposed in semiconductor material, the MZI having first and second arms; wherein an optical beam is to propagate through the MZI in a forward direction; and
first and second optical modulators disposed in the first and second arms, respectively, of the MZI, the first and second optical modulators having traveling wave electrodes coupled to receive first and second traveling wave signals, respectively, to generate traveling waves in the MZI that propagate in a reverse direction opposite to the forward direction, the first and second traveling wave signals to have a pi phase shift relative to each other such that there is constructive interference of the optical beam propagating through the MZI in the forward direction and there is destructive interference of an optical beam propagating through the MZI in the reverse direction.

2. The apparatus of claim 1 further comprising a traveling wave driver circuit to generate the first and second traveling wave signals having the pi phase shift relative to each other.

3. The apparatus of claim 2 wherein the traveling wave driver circuit is disposed in the semiconductor material.

4. The apparatus of claim 1 wherein the first and second optical modulators are coupled not to introduce a relative phase shift between portions of the optical beam propagating through the MZI in the forward direction in response to the first and second traveling wave signals.

5. The apparatus of claim 1 wherein the first and second optical modulators are coupled to introduce a relative pi phase shift between portions of the optical beam propagating through the MZI in the reverse direction in response to the first and second traveling wave signals.

6. The apparatus of claim 1 wherein each of the first and second optical modulators include:
a first region of an optical waveguide disposed in the semiconductor material, the first region having a first conductivity type;
a second region of the optical waveguide disposed in the semiconductor material, the second region having a second conductivity type opposite to the first conductivity type;
a first traveling wave electrode coupled to the optical waveguide at a first location outside an optical path of the optical waveguide; and
a first buffer of insulating material disposed along the optical waveguide between the first traveling wave electrode and the optical path of the optical waveguide.

7. The apparatus of claim 6 wherein each of the first and second optical modulators further include an insulating region disposed between the first and second regions of the optical waveguide.

8. The apparatus of claim 6 wherein each of the first and second modulators further include:
a second traveling wave electrode coupled to the optical waveguide at a second location outside the optical path of the optical beam; and
a second buffer of insulating material disposed along the optical waveguide between the second traveling wave electrode and the optical path of the optical beam.

9. The apparatus of claim 8 wherein the first and second buffers of insulating material are adapted to serve as electrical isolators to isolate first and second contacts from the optical path of the optical beams.

10. A method, comprising:
splitting a first optical beam propagating in a forward direction received by a Mach-Zehnder Interferometer (MZI) into first and second portions, the first and second portions of the first optical beam directed into first and second arms, respectively, of the MZI;
propagating traveling waves having a pi phase difference in a reverse direction in optical modulators in the first and second arms of the MZI such that the first and second portions of the first optical beam counter-propagate to the traveling waves in the first and second arms of the MZI;
transmitting the first optical beam from the MZI in the forward direction;
splitting a second optical beam propagating in the reverse direction received by the MZI into first and second portions, such that the first and second portions of the second optical beam co-propagate with the traveling waves in the first and second arms, respectively, of the MZI; and
destructively interfering the first and second portions of the second optical beam to block propagation of the second optical beam from the MZI in the reverse direction.

11. The method of claim 10 further comprising introducing relatively no phase shift between the first and second portions of the first optical beam propagating in the forward direction with the optical modulators in the first and second arms of the MZI in response to the traveling waves.

12. The method of claim 10 further comprising constructively interfering the first and second portions of the first optical beam to allow propagation of the first optical beam from the MZI in the forward direction.

13. The method of claim 10 further comprising introducing a relative pi phase shift between the first and second portions of the second optical beam propagating in the reverse direction with the optical modulators in the first and second arms of the MZI in response to the traveling waves.

14. The method of claim 10 further comprising generating first and second traveling wave signals having a relative pi phase difference between them with a traveling wave driver circuit disposed in a same semiconductor material in which the MZI is disposed.

15. The method of claim 10 further comprising introducing relatively no phase shift between the first and second portions of the first optical beam with the optical modulators in the first and second arms of the MZI in response to the traveling waves.

16. The method of claim 10 wherein the MZI is disposed in an optical material including one of a semiconductor material, silicon, an organic material or a polymer material.

17. A system, comprising:
an optical source coupled to transmit a first optical beam in a forward direction;
an optical receiver coupled to receive the first optical beam from the optical source;
an optical isolator optically coupled between the optical source and the optical receiver, the optical isolator including:
a Mach-Zehnder Interferometer (MZI) disposed in semiconductor material, the MZI having first and second arms; and
first and second optical modulators disposed in the first and second arms, respectively, of the MZI, the first and second optical modulators having traveling wave electrodes coupled to receive first and second traveling wave signals, respectively, to generate traveling waves in the MZI that propagate in a reverse direction opposite to the forward direction, the first and second traveling wave signals to have a pi phase shift relative to each other such that there is constructive interference of the first optical beam propagating through the MZI in the forward direction and there is destructive interference of a second optical beam propagating through the MZI in the reverse direction; and an optical fiber optically coupled between the optical isolator and the optical receiver.

18. The system of claim 17 wherein the semiconductor material includes silicon.

19. The system of claim 17 wherein the optical source is included in the semiconductor material.

20. The system of claim 17 further comprising a traveling wave driver circuit included in the semiconductor material to generate the first and second traveling wave signals received by traveling wave electrodes of the first and second optical modulators in the first and second arms of the MZI.

21. The system of claim 17 wherein the second optical beam propagating through the MZI in the reverse direction is a reflection of the first optical beam propagating through the MZI in the forward direction, wherein the constructive interference of the first optical beam propagating through the MZI in the forward direction allows the first optical beam to be transmitted from the MZI and wherein the destructive interference of a second optical beam propagating through the MZI in the reverse direction blocks the second optical beam from being transmitted from the MZI.

* * * * *